United States Patent [19]  [11] 3,874,963
Barger  [45] Apr. 1, 1975

[54] SONIC BONDING PROCESS

[75] Inventor: Michael B. Barger, Findlay, Ohio

[73] Assignee: R. L. Kuss & Co., Inc., Findlay, Ohio

[22] Filed: Nov. 8, 1973

[21] Appl. No.: 413,879

[52] U.S. Cl............... 156/73.2, 29/470.3, 156/580, 156/73.4, 228/1, 242/58.5, 264/23
[51] Int. Cl............................................. B32b 31/20
[58] Field of Search ............... 156/73, 580; 264/23; 29/470.3; 228/1, 2; 242/58.5

[56] References Cited
UNITED STATES PATENTS

| | | | |
|---|---|---|---|
| 3,047,942 | 8/1962 | Schneider et al. | 156/73 X |
| 3,284,257 | 11/1966 | Soloff et al. | 156/73 |
| 3,462,803 | 8/1969 | Horton | 156/73 X |
| 3,519,507 | 7/1970 | Pierson | 156/73 |
| 3,602,257 | 8/1971 | Berleyoung | 156/73 |

Primary Examiner—Edward G. Whitby
Attorney, Agent, or Firm—Owen & Owen Co.

[57] ABSTRACT

A method for bonding articles of thermoplastic material through use of high frequency sonic energy. The method includes the use of an elongate filamentary energy director, independent of the articles to be bonded but preferably of the same material inserted at the interface of the articles to be bonded. The energy director serves to focus the area in which energy is dissipated and in which bonding occurs, thus speeding the bonding process and providing a more uniform, stronger and better appearing bond.

4 Claims, 5 Drawing Figures

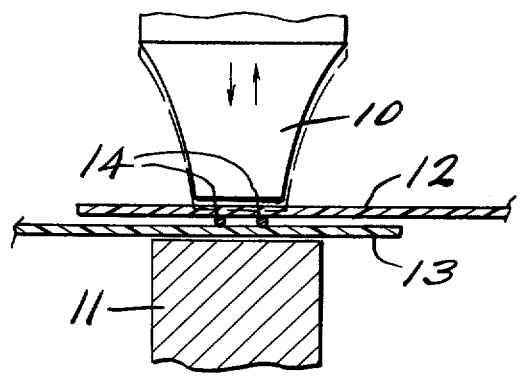
FIG-1-
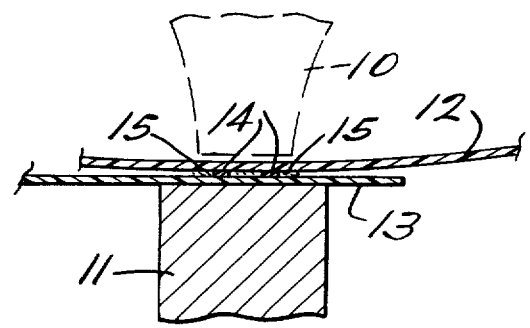
FIG-2-
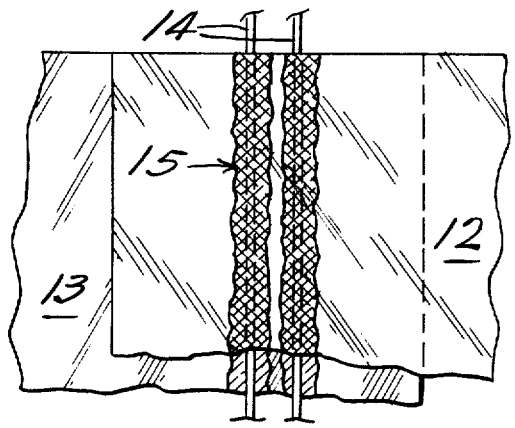
FIG-3-
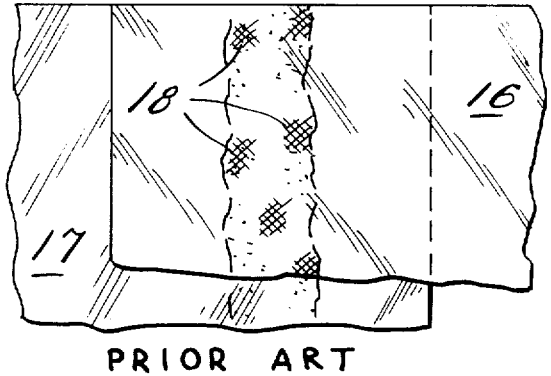
PRIOR ART
FIG-4-
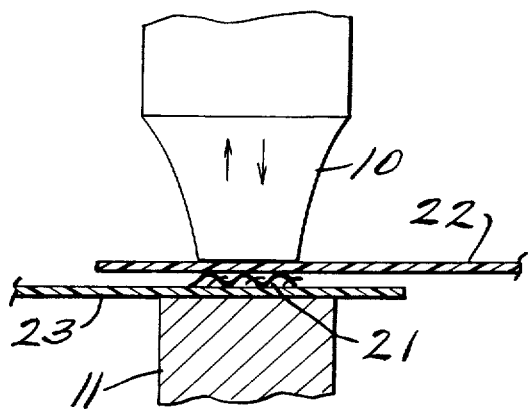
FIG-5-

SONIC BONDING PROCESS

BACKGROUND OF THE INVENTION

The invention relates to high frequency sonic bonding, and more particularly, to methods of bonding thermoplastic materials utilizing energy directors to focus the area of energy dissapation in the interface of the parts being joined.

The use of high frequency sound waves, sonic energy, both sub-sonic and ultrasonic, to bond thermoplastic materials is an efficient, economical method presently employed in many industries. The process involves high frequency mechanical vibrations which cause friction and melting at adjoining surfaces, fusing them together in a strong, molecular bond. Generally, this is accomplished by means of a vibrator known as a horn which presses against the plastic components to channel mechanical vibrations, at, for example, 20 kHz into the joint. A fixed rigid member usually called an anvil is disposed opposite the horn and the thermoplastic members are clamped therebetween at a predetermined clamping pressure for the duration of the vibrations or longer.

For optimum results in sonic bonding or welding as it is often called, provision at the joint must be made for the release or direction of energy at the proper place and for controlled flow of material. See, for example, U.S. Pat. No. 3,224,916 which discusses the direction or focusing of such energy at the interface of the materials to be joined. Energy directors have been incorporated into the joint design to facilitate more efficient welding. These energy directors are made from the same thermoplastic materials and generally comprise integral projections on one or both of the surfaces to be bonded, and may be triangular, truncated, or rectangular in cross section. These projections concentrate the dissipation of the friction-producing energy to produce an efficient, concentrated, strong molecular bond rather than a weak, spotty weld. For an example of such an integrally formed director configuration, see U.S. Pat. No. 3,462,803.

In the bonding of seams of sheet material, integral energy directors may be formed during extrusion of one or both of the sheet components to produce a continuous linear energy director. Such energy directors are advantageous in bonding situations which involve elongate linear seams on items of manufacture where repetitive seams are used on high volume assemblage where the integral directors can be formed in the necessary location in accordance with a predetermined pattern. However, if an article to be produced by such bonding must have seams extending in several or many directions or for custom fabrication work, such unidirectional extruded energy directors cannot be employed. Conventional sonic bonding equipment and methods does not provide a way of efficiently concentrating ultrasonic energy in the production of such articles.

SUMMARY OF THE INVENTION

The present invention provides a process for efficiently producing sonically bonded seams in articles manufactured from compatible thermoplastic materials. The process includes the use of independent energy directors inserted between the surfaces to be bonded along the path of the desired seam. The energy directors may comprise one or several filaments or a strip of fabric. Optimum results depend on fusional compatibility of the energy director material with the material to be bonded, and energy directors of identical material are preferred.

The sonic bond thus produced according to the invention is concentrated at the location of the energy directors inserted between the surfaces of thermoplastic material.

BRIEF DESCRIPTION OF THE DRAWINGS

FIG. 1 is an elevational, partially sectioned view of a sonic horn and anvil about to produce a seam incorporating independent energy directors according to the method of the present invention;

FIG. 2 is a sectional view of a seam thus produced;

FIG. 3 is a plan view of the seams;

FIG. 4 is a plan view of a seam produced without the independent energy directors of the present method; and FIG. 5 is a sectional view of another type independent energy director inserted between components of thermoplastic material.

DESCRIPTION OF THE PREFERRED EMBODIMENT

Referring to FIG. 1 of the drawings, a sonic horn 10 is indicated oppositely disposed from a support anvil 11. The horn 10 is driven by a transducer (not shown) which produces the ultrasonic vibrations, and is coupled to a press (not shown) for producing and maintaining a clamping force against the anvil 11. Between the horn 10 and anvil 11 are a pair of thermoplastic components 12 and 13 which may be sheet material disposed for production of a lap seam. Thermoplastic materials such as nylon, polystyrene, polypropylene, polyethylene, vinyls and other such materials known to the art can be used. Inserted between the components 12 and 13 are a pair of filaments 14 which serve as energy directors during the bonding of the components 12 and 13 according to the method of the present invention. The filaments 14 may be of any cross-sectional shape, such as cylindrical, rectangular, triangular, etc., and the word "filament", as used herein and in the following claims, is intended to include any of such shapes. These energy directors 14 may comprise one or several such filaments. The components 12 and 13 and the energy directors 14 are of identical or compatible thermoplastic materials. Compatible, as used herein, means that the materials will thermally fuse or weld together.

FIG. 2 indicates, in cross section, a sonic bond or weld produced according to the method of the invention. The energy directors 14 have concentrated the surface friction and heat produced by the sonic vibrations into the area shown. The material 15 has flowed in a controlled manner from the energy directors 14 and the plastic components 12 and 13 to produce a strong fusion joint. The lap seam produced according to the method of the present invention is indicated in plan view in FIG. 3. FIG. 4 indicates a lap seam produced under like conditions between thermoplastic sheet components 16 and 17 but without the energy directors 14. Such a process produces sporadic weld spots 18 due to the lack of concentration of vibrational energy, and the result is a weak, poorly sealed seam which may take longer and is less satisfactory in appearance and strength.

Referring now to FIG. 5, another type of independent energy director 21 is shown inserted between a pair of thermoplastic components 22 and 23 to be bonded between a horn 10 and anvil 11. The energy director 21 comprises a woven thermoplastic mesh which will produce a very strong concentrated weld between the component 22 and 23. The components 22 and 23 and the energy directors 21 are again of identical or at least compatible material.

As an example, strongly sealed joints between nylon sheets have been efficiently produced according to this invention utilizing nylon filament energy directors. Nylon monofilaments are commercially available with nominal diameters of 0.018 inches and have been used to make good joints of the double filament type of FIGS. 1–3 with nylon sheets of 0.020 inches thickness. Nylon is a moisture-absorbing material, and best results in sonic bonding are obtained with hard dry nylon which has not had extended exposure to moisture. Moist nylon can actually have a damping effect on the ultrasonic vibrations from the horn thus inhibiting the occurence of friction and heat for fusion. Also, the moisture in such nylon can be "boiled out" during application of sonic energy, thus producing an undesirable frothing effect which results in a very weak bond.

When using such monofilaments as an energy director between sheets having planar surfaces, as for a simple lap seam as described, it is believed that the filament diameter should be at least half the sheet thickness for a good bond. If smaller filaments are used, a twisted strand or yarn of a multiplicity of finer filaments can be used.

As previously stated, the method of this invention is particularly suited to assembly of parts where custom fabrication or low repetitive assembly steps dictate against the use of integrally formed energy directors. This is particularly true when thermoplastic sheets are to be joined together in a three-dimensional figure in which a lap joint extends, for example, around a corner or at an acute angle.

In handling the independent, filamentary energy director utilized in the method of this invention, for example, in making a sonic bonded lap seam of two thermoplastiic shapes, the filament or filaments are placed loosely between the sheets which are then placed between the horn and anvil. Once the bonding has started and the lapped edges are progressively moved toward the bonding area, a light tension placed upon the filament or filaments is effective to keep it in proper position. In fact the filaments can be stored on a reel adjacent the bonding area and fed toward the horn along with the lapped seams, particularly for large seams, with a slight drag kept on the reel.

In other more complex operations, the filament or filaments can be spotted or tacked in position prior to the seam joining or the filaments can be provided with an adhesive which is effective to temporarily position it over complex curvatures, etc.

Clamping pressure exerted by the horn and anvil on the thermoplastic components is an important variable in sonic bonding, particularly when energy directors are employed. Excessive pressure will damp out the vibrations partially or completely, inhibiting bonding. However, pressure must be sufficient to actually transfer mechanical vibrations into the joint to produce the necessary friction and heat fusion.

The above described preferred embodiment provides an ultrasonic bonding process capable of producing strong, tightly sealed seams in the production of articles having joints of thermoplastic materials. The independent energy directors employed in the process facilitate the sonic formation of joints extending in multiple directions on such articles and on custom fabricated articles where the use of preformed energy directors is impossible or impractical. Various embodiments and alterations to this preferred embodiment will be apparent to those skilled in the art and may be made without departing from the spirit and scope of the following claims.

What I claim is:

1. A process for producing a heat-fused joint between members of a thermoplastic article, comprising the steps of:
   abutting surfaces of the members to be joined along the path of the intended joint while positioning between the members along the path of the intended joint at least one separate filamentary energy director of a fusibly compatible thermoplastic material; and
   inducing mechanical friction-producing vibrations among the members and energy directors while applying to the members along the path of the intended joint an external clamping force whereby the abutting surfaces of the members to be joined and said fusibly compatible filamentary energy director are fused to one another along a path defined by said energy director.

2. A process for producing a heat-fused joint between overlapped members of a thermoplastic article, comprising the steps of:
   inserting between the overlapping members along the path of the intended joint at least one filamentary energy director of fusibly compatible thermoplastic material; and
   inducing mechanical friction-producing vibrations among the members and energy directors while applying to the members along the path of the intended joint an external clamping force whereby the abutting surfaces of said overlapped members and said fusibly compatible filamentary energy director are fused to one another along a path defined by said energy director.

3. A process for producing a heat-fused joint between overlapped members of a thermoplastic article, comprising the steps of:
   inserting between the overlapped members along the path of the intended joint an energy director comprising an elongate strip of an interwoven mesh of compatible thermoplastic material; and
   inducing mechanical friction-producing vibrations among the members and said energy director while applying to the members along the path of the intended joint an external clamping force.

4. A method of making a sonic bonded joint between two abutting edges of thermoplastic material comprising the steps of positioning one end of an elongate filamentary energy director of a compatible material between an initial position of said abutting edges in the position desired for said bonded joint, laterally moving said abutting edges past a source of sonic energy to fuse together said edges and energy director to form a seal along said edges at said desired position while serially feeding successive lengths of said filamentary energy director between successive portions of said abutting edges to position it in the desired position for said bonded joint extending through said successive portions.

* * * * *